United States Patent
Fukuma et al.

(10) Patent No.: US 8,217,367 B2
(45) Date of Patent: Jul. 10, 2012

(54) SCANNER DEVICE FOR SCANNING PROBE MICROSCOPE

(75) Inventors: Takeshi Fukuma, Ishikawa (JP); Toshio Ando, Ishikawa (JP); Yasutaka Okazaki, Ishikawa (JP)

(73) Assignee: National University Corporation Kanazawa University, Ishikawa (JP)

( * ) Notice: Subject to any disclaimer, the term of this patent is extended or adjusted under 35 U.S.C. 154(b) by 82 days.

(21) Appl. No.: 12/995,875

(22) PCT Filed: May 29, 2009

(86) PCT No.: PCT/JP2009/002381
§ 371 (c)(1),
(2), (4) Date: Dec. 2, 2010

(87) PCT Pub. No.: WO2009/147807
PCT Pub. Date: Dec. 10, 2009

(65) Prior Publication Data
US 2011/0093989 A1    Apr. 21, 2011

(30) Foreign Application Priority Data
Jun. 4, 2008    (JP) .................................. 2008-147041

(51) Int. Cl.
*G01Q 10/00*    (2010.01)
(52) U.S. Cl. ............ 250/442.11; 850/1; 850/33; 73/105

(58) Field of Classification Search ............. 250/442.11, 250/440.11; 850/1, 2, 3, 26, 33, 53; 73/105
See application file for complete search history.

(56) References Cited

U.S. PATENT DOCUMENTS

| | | | |
|---|---|---|---|
| 6,346,710 B1 * | 2/2002 | Ue ........................... | 250/442.11 |
| 6,809,306 B2 * | 10/2004 | Ando et al. ................ | 250/201.3 |
| 2008/0212174 A1 | 9/2008 | Tomitori et al. | |

FOREIGN PATENT DOCUMENTS

| | | |
|---|---|---|
| JP | 63-265573 A | 11/1988 |
| JP | 2002-082036 A | 3/2002 |
| JP | 2008-295230 A | 12/2008 |
| WO | 2006-057300 A1 | 6/2006 |

OTHER PUBLICATIONS

International Search Report for PCT/JP2009/002381; Sep. 1, 2009.

* cited by examiner

*Primary Examiner* — Kiet T Nguyen
(74) *Attorney, Agent, or Firm* — Pearne & Gordon LLP

(57) ABSTRACT

A scanner device is provided which enables high-frequency scanning and can increase the speed of a scanning probe microscope. A scanner device (1) used for a scanning probe microscope includes a Z actuator (7) which scans an object to be scanned in a scanning direction, and a Z actuator holder (11) which holds the Z actuator (7). The Z actuator holder (11) holds the Z actuator (7) at a plurality of holding line parts which extend in the scanning direction and are separated from each other. For example, the Z actuator (7) has a rectangular cross-section, and the four edges of the Z actuator (7) are held by the Z actuator holder (11). The Z actuator (7) is pressed into a holding hole (29) of the Z actuator holder (11).

13 Claims, 11 Drawing Sheets

(Prior Art)

Cross-Section AA

Cross-Section BB

Cross-Section CC

SCANNER DEVICE FOR SCANNING PROBE MICROSCOPE

CROSS REFERENCE TO RELATED APPLICATIONS

The present application claims the benefit of Japanese Patent Application No. 2008-147041, filed on Jun. 4, 2008, the entire contents of which are hereby incorporated by reference herein.

TECHNICAL FIELD

The present invention relates to a scanner device for a scanning probe microscope, and more particularly to technology for realizing high-speed scanning.

BACKGROUND ART

Scanning probe microscopes (SPM) are conventionally used to observe minute samples. Examples of a typical SPM include an atomic force microscope (AFM) and a scanning tunneling microscope (STM). An SPM brings a sharply pointed probe close to a sample, detects an interaction that acts between the probe and the sample, and performs feedback control with respect to the distance between the probe and sample so that the interaction is kept constant. The interaction is a tunnel current or an interactive force or the like. The SPM scans the probe (or sample) in a horizontal direction in a state in which feedback control is maintained. As a result, the probe (or sample) rises and falls so as to trace over the concavities and convexities of the probe (or sample). By recording the trajectory of the scan, a topographic image of the sample surface is obtained.

With an SPM, the aforementioned horizontal direction of scanning is referred to as the "XY direction", and the vertical direction is referred to as the "Z direction". A scanner of an SPM is configured to be able to perform scanning in the X direction, Y direction, and Z direction. For example, a conventional common tripod-type scanner has a configuration in which three scanners that are arranged on an X-axis, Y-axis, and Z-axis, respectively, are combined at one location. Each actuator comprises a piezoelectric body (piezo element). A tripod-type scanner is disclosed, for example, in Japanese Patent Laid-Open No. 63-265573.

In order to perform surface shape observation at a high speed using an SPM, it is necessary for a scanner to scan a probe (or sample) at a high speed. The scanning frequency of a scanner is limited by the resonance frequency in each axial direction. Accordingly, in order to perform high-speed imaging using an SPM, it is necessary to make the resonance frequency of the scanner as high as possible. When performing observation with an SPM, the scanner is required to operate at the fastest speed in the vertical (Z) axis direction. In many cases, the overall operating speed is limited by the resonance frequency in the Z-axis direction. It is therefore particularly important to increase the resonance frequency in the Z-axis direction.

As shown in FIG. 1A, the resonance frequency when a piezoelectric body of a Z-axis scanner oscillates freely in the vertical direction is taken as f0. A conventional common scanner has a structure in which one end is fixed, as shown in FIG. 1B. In this conventional structure, the bottom surface of the piezoelectric body is fixed to a support part. According to this structure, the resonance frequency in the Z direction is half of the resonance frequency f0 for free oscillation, that is (½) f0, and consequently the resonance frequency is significantly deceased.

According to the conventional structure shown in FIG. 1B, a displacement of the piezoelectric body of the Z-axis scanner oscillates asymmetrically with respect to the center of gravity of the piezoelectric body. Consequently, a large impact is generated by the oscillation. This impact is transmitted through the support part on the lower side, and increases a force that excites a resonant oscillation of other portions that are included in the X-axis and Y-axis scanners. When oscillation of another portion is excited, conversely the impact of such oscillation is transmitted in the Z-axis direction, leading to the occurrence of an oscillation in the Z-axis direction. As a result, it is not possible to use the scanner at a frequency that is greater than or equal to the resonance frequency (lower than the resonance frequency in the Z-axis direction) of other portions included in the scanner. This phenomenon further limits the scanning frequency of the Z-axis scanner to a frequency lower than the resonance frequency.

The resonance frequency of free oscillation of a Z-axis scanner is, for example, approximately several hundred kHz. Further, an oscillation frequency caused by the above described impact is, for example, several tens of kHz. On the other hand, the scanning frequency of a conventional common scanner is, at the highest, approximately 1 kHz. Therefore, in the conventional common scanners, the resonance frequency or oscillations caused by an impact have not constituted a significant problem. However, the resonance frequency and oscillations caused by an impact become a problem when attempting to increase the scanning frequency to increase the speed of an SPM.

Japanese Patent Laid-Open No. 2002-82036 proposes supporting a center part of a side surface of a piezoelectric body. This structure can decrease the oscillations of a scanner by balancing impacts that arise in the upper half and lower half of the piezoelectric body. However, since one side surface of the piezoelectric body is being supported, another mode of oscillation arises, and this fact limits the scanning frequency of the scanner. Further, the structure that supports a side surface of a piezoelectric body reduces the resonance frequency in comparison with a free oscillation state.

SUMMARY OF INVENTION

Technical Problem

The present invention has been made in view of the foregoing circumstances, and an object of the invention is to provide technology that enables scanning at higher frequencies and that can increase the speed of an SPM.

Solution to Problem

The present invention relates to a scanner device that is used in a scanning probe microscope. A scanner device of the present invention includes an actuator that scans an object to be scanned in a scanning direction, and an actuator holder that holds the actuator, wherein the actuator holder holds the actuator at a plurality of holding line parts that extend in the scanning direction and which are separated from each other.

According to another aspect of the present invention there is provided a method of scanning an object to be scanned for a scanning probe microscope, wherein an actuator is provided for scanning an object to be scanned in a scanning direction, and scanning is performed in a state in which the actuator is held at a plurality of holding line parts that extend in the scanning direction and which are separated from each other.

Another aspect of the present invention provides a method of manufacturing a scanner device to be used in a scanning probe microscope. According to this method, an actuator is prepared that scans an object to be scanned in a scanning direction, and the actuator is held at a plurality of holding line parts that extend in the scanning direction and which are separated from each other.

A further aspect of the present invention provides a scanning probe microscope that includes the above described scanner device.

Advantageous Effects of Invention

By having the above described configuration, the present invention can enable scanning at higher frequencies and increase the speed of an SPM.

As described hereunder, other aspects of the present invention exist. Therefore, this disclosure of the invention is intended to provide some aspects of the present invention, and is not intended to limit the scope of the invention as described and claimed herein.

DESCRIPTION OF EMBODIMENTS

Figure 1A:
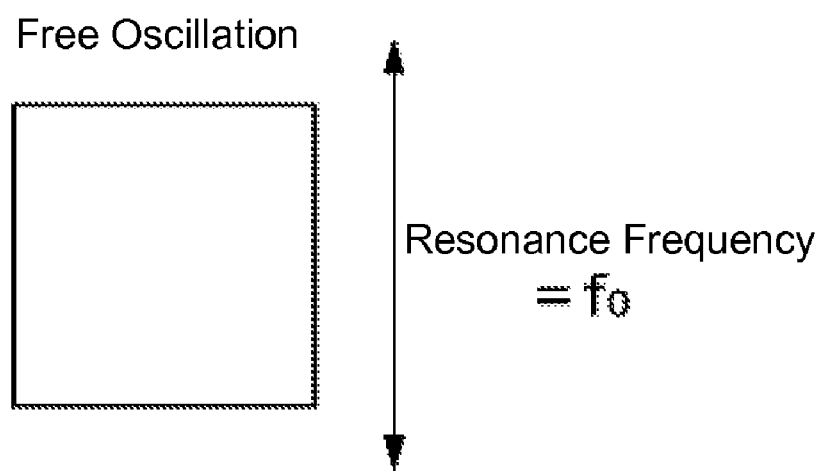
FIG. 1A is a view that illustrates a piezoelectric element in a free oscillation state.
Figure 1B:
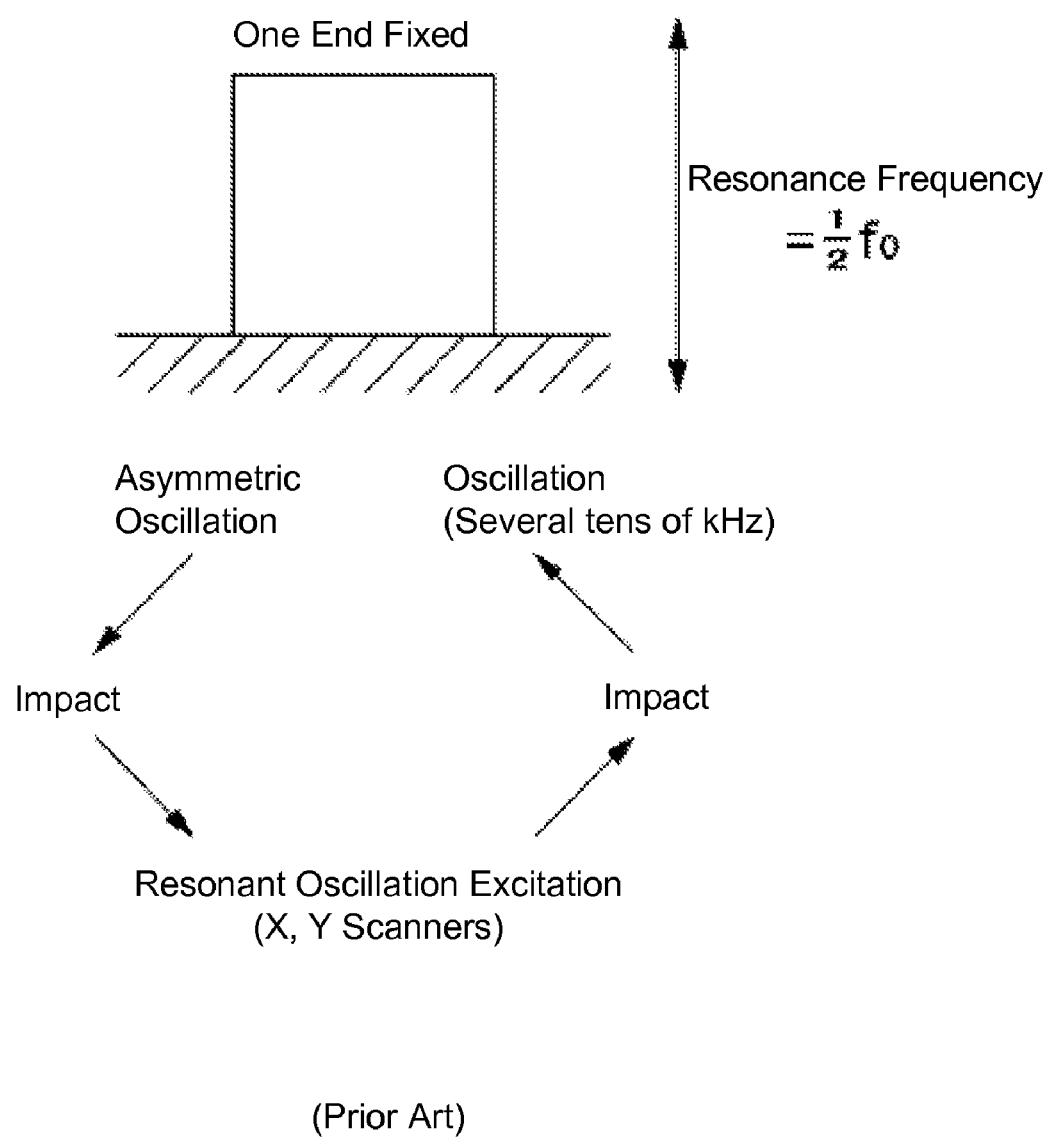
FIG. 1B is a view that illustrates a conventional Z-axis scanner that uses a piezoelectric element.

The present invention is described in detail hereunder. The following detailed description and the attached drawings do not limit the invention. Instead, the scope of the invention is defined by the claims attached hereto.

The present invention relates to a scanner device that is used in a scanning probe microscope. The scanner device of the present invention includes an actuator that scans an object to be scanned in a scanning direction, and an actuator holder that holds the actuator. The actuator holder holds the actuator at a plurality of holding line parts (or holding lines) that extend in a scanning direction and that are separated from each other.

According to the present invention, the actuator and actuator holder may contact at a line (or linear portion), or a contact line may correspond to the above described holding line part.

A contact width (width of holding line part) may be substantially small, and may be substantially zero or close to zero. A contact area may be extremely small, and may almost not exist. A holding line part may also be referred to as a "linear holding part" or "linear contact part". A holding line part may be realized by contact between an edge and a surface. According to the example described below, an edge of the actuator and a surface of the actuator holder contact. Alternatively, a surface of the actuator and an edge of the actuator holder may contact.

The actuator holding structure of the present invention can be a linear holding structure. Further, a plurality of holding line parts may be symmetrically arranged as described below, and a holding structure of the present invention can be referred to as a "symmetrical linear holding structure".

As described above, according to the present invention, the actuator holder holds the actuator at a plurality of holding line parts that extend in the scanning direction. The actuator, for example, is constituted by a piezoelectric element. Accordingly, mechanical coupling between the actuator and other parts is suppressed to a low level and the actuator has a high degree of independence, and can change position evenly to both sides along the scanning direction in a state close to free oscillation. The impact of oscillation of the actuator can be mitigated, and the resonance frequency can be made a value close to the resonance frequency of free oscillation. Accordingly, scanning can be performed at a higher frequency and a higher speed than in the conventional devices.

The plurality of holding line parts may be arranged at regular intervals around the circumference of the actuator, and may be parallel to the scanning direction. According to this configuration, holding of the actuator with the plurality of holding line parts can be favorably implemented.

The actuator holder may hold the actuator by pressing the actuator at a plurality of holding line parts. Since this configuration holds the actuator with a pressing force, the configuration can weaken the constraints with respect to a change in shape in the vertical direction of the actuator. Accordingly, the actuator can oscillate in a state that is closer to free oscillation, the impact of oscillation of the actuator can be decreased further, and the resonance frequency can be brought close to the resonance frequency of free oscillation.

The actuator may have a shape that includes a plurality of edges that extend in a scanning direction, and a plurality of edges may contact a face of the actuator holder. According to this configuration, holding of the actuator with the plurality of holding line parts can be favorably implemented.

The actuator holder may have a holding hole in a scanning direction. The actuator may have a polygonal cross-sectional shape that contacts the inside of the holding hole, and may be held inside the holding hole. According to this configuration, the actuator holder surrounds the actuator, and holding of the actuator with the plurality of holding line parts can be favorably implemented.

The actuator may be pressed into the holding hole of the actuator holder so as to touch the actuator holder at a plurality of holding line parts. Since this configuration holds the actuator with a pressing force, the configuration can weaken the constraints with respect to a change in shape in the vertical direction of the actuator. Accordingly, the actuator can oscillate in a state that is closer to free oscillation, the impact of oscillation of the actuator can be decreased further, and the resonance frequency can be brought close to the resonance frequency of free oscillation.

The actuator holder may be made from an insulating material. This configuration makes it possible to maintain an insulation state even when an actuator holding line part has been damaged, and accordingly can improve the reliability.

An elastomer may be provided in a gap between the inner surface of the holding hole of the actuator holder and the outer surface of the actuator. An elastomeric material may be filled into the gap. This configuration further decreases the impact of oscillation of the actuator. Even when oscillations remain in the linear holding structure of the present invention, the remaining oscillations can be favorably decreased. Accordingly, the scanning frequency and scanning speed can be favorably increased.

The scanner device may include another actuator that performs scanning in a direction that is different to the scanning direction. The another actuator may support the actuator holder at a side of the actuator. For example, the actuator may be an actuator in the Z-axis direction and the another actuator may be an actuator in the X-axis direction and/or an actuator in the Y-axis direction. This configuration can make it difficult for oscillations of the actuator to be transmitted to the another actuator. Accordingly, the level of independence of the actuator can be further increased, and the scanning frequency and scanning speed can also be increased.

The actuator supports an object to be scanned at one end in the scanning direction, and may also support a counter weight at the other end in the scanning direction. This configuration can make the weights at the two ends of the actuator equal, and thereby further reduce oscillations of the actuator and enable an increase in the scanning frequency and scanning speed.

Another aspect of the present invention provides a method of scanning an object to be scanned for a scanning probe microscope. According to this method, an actuator is provided for scanning an object to be scanned in a scanning direction, and scanning is performed in a state in which the actuator is held at a plurality of holding line parts that extend in the scanning direction and are separated from each other. This aspect can also apply the various configurations described in the foregoing aspect relating to the device.

A further aspect of the present invention is a method of manufacturing a scanner device that is used in a scanning probe microscope. According to this method, an actuator is prepared that scans an object to be scanned in a scanning direction, and the actuator is held at a plurality of holding line parts that extend in the scanning direction and are separated from each other. The above described advantages of the present invention can also be obtained by this method. This aspect can also apply the various configurations described in the foregoing aspect relating to the device.

A further aspect of the present invention provides a scanning probe microscope that includes the above described scanner device. The above described advantages of the present invention can also be obtained by this aspect. This aspect can also apply the various configurations described in the foregoing aspect relating to the scanner device. The scanning probe microscope (SPM) may be an atomic force microscope (AFM), and more particularly may be an FM (Frequency Modulation)-AFM.

A preferred embodiment of the present invention is described hereunder with reference to the drawings.

Figure 2:
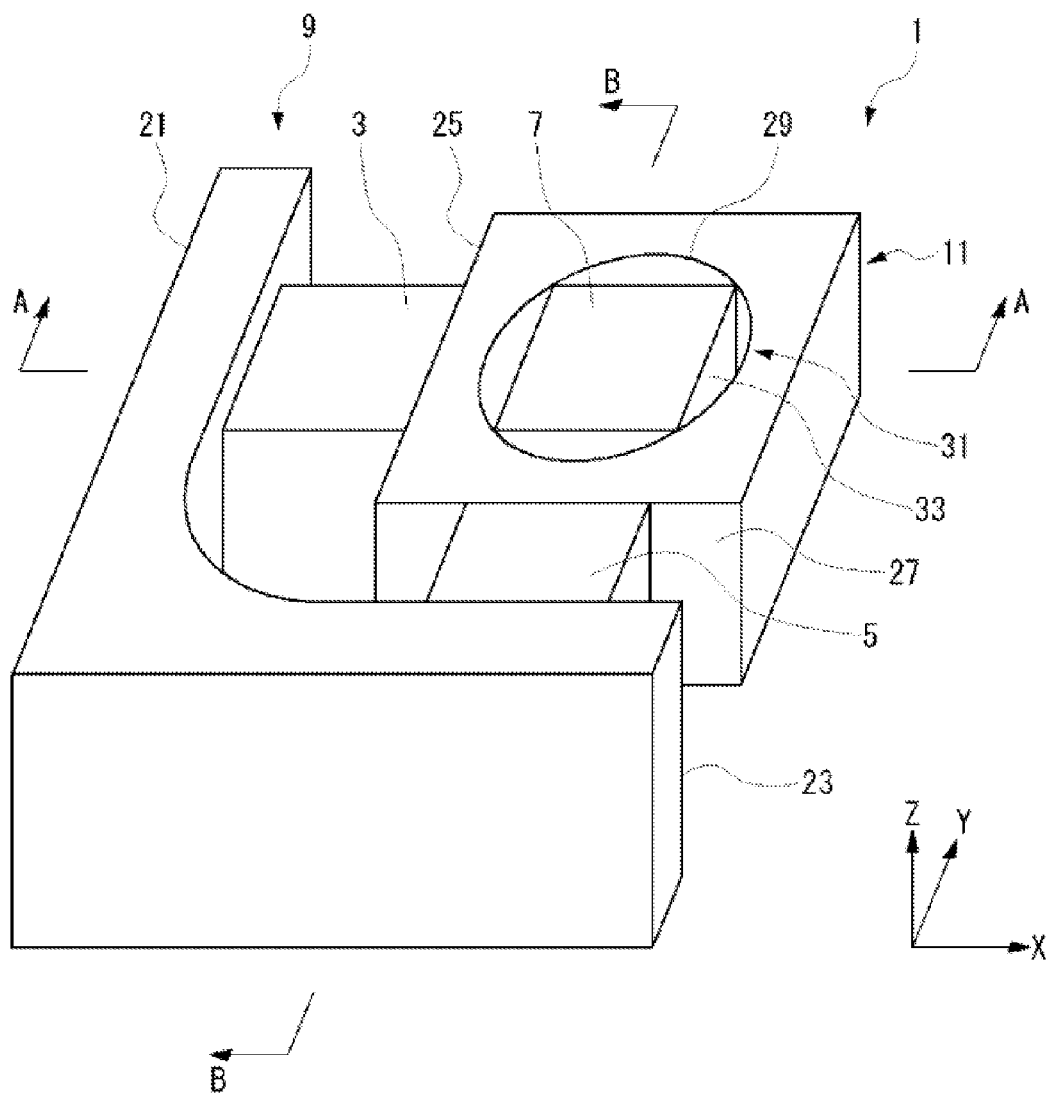
FIG. 2 is an oblique perspective figure that illustrates a scanner device according to an embodiment of the present invention.
Figure 3A:
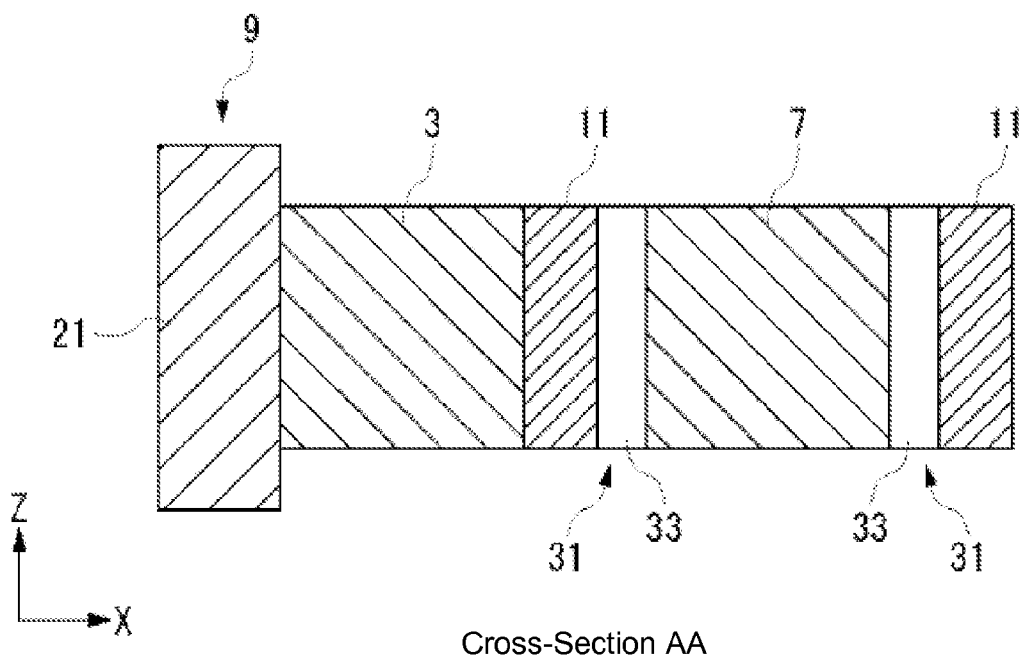
FIG. 3A is a cross-sectional view of the scanner device that shows a cross section in the X direction.
Figure 3B:
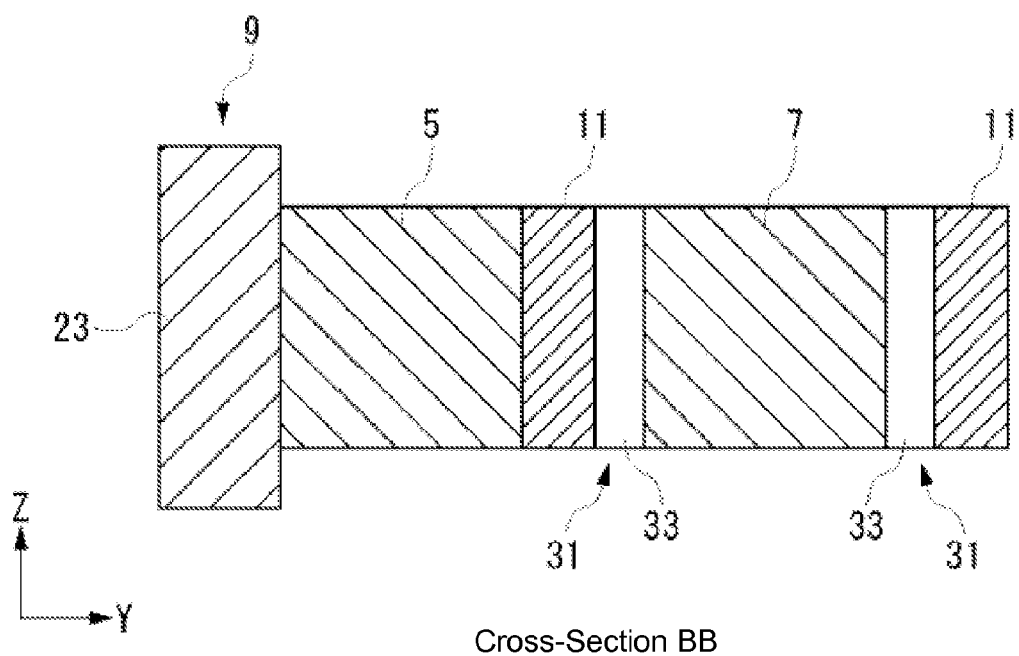
FIG. 3B is a cross-sectional view of the scanner device that shows a cross section in the Y direction.
Figure 4A:
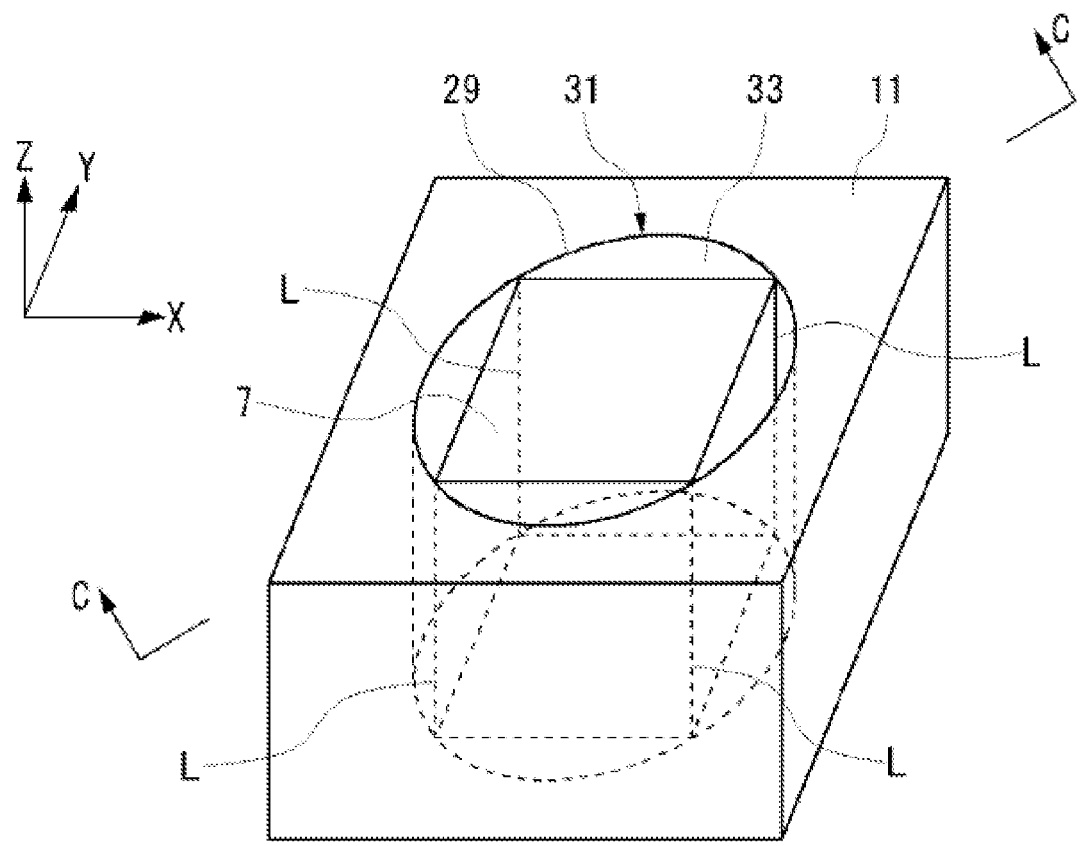
FIG. 4A is an oblique perspective figure of a Z scanner portion of the scanner device.
Figure 4B:
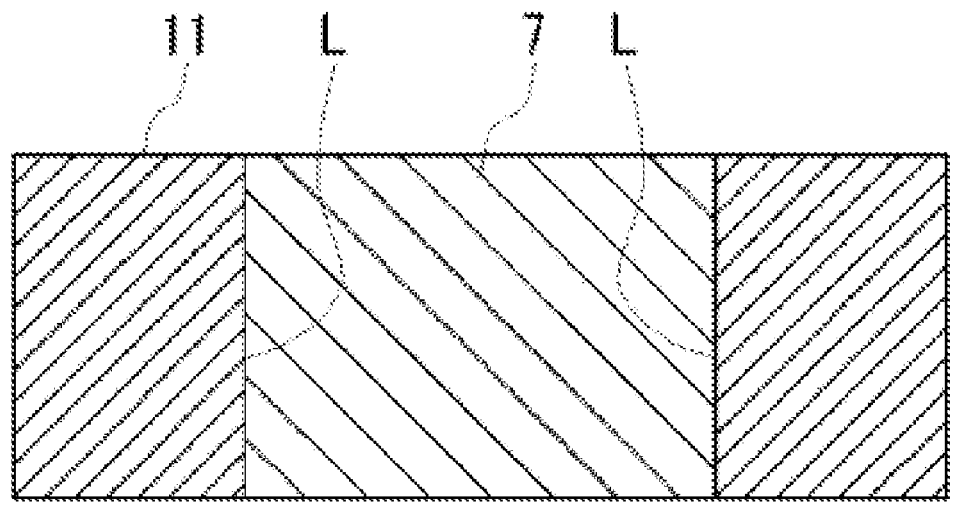
FIG. 4B is a cross-sectional view of the Z scanner portion of the scanner device.

FIG. 2 is an oblique perspective view that illustrates a scanner device according to the present embodiment. FIG. 3A and FIG. 3B are cross-sectional views that show a cross section of the scanner device in the X direction and Y direction, respectively, which are cross sections along the lines A-A and B-B in FIG. 2. FIG. 4A is an oblique perspective view of a Z-axis scanner portion. FIG. 4B is a cross-sectional view of the Z-axis scanner along a line C-C shown in FIG. 4A, that is, a section along a diagonal line.

As illustrated in the abovementioned drawings, a scanner device 1 includes an X actuator 3, a Y actuator 5, and a Z actuator 7. The X actuator 3, Y actuator 5, and Z actuator 7 are an X-axis scanner, a Y-axis scanner, and a Z-axis scanner that expand and contract in the X-axis direction, the Y-axis direction, and the Z axis direction, respectively. These three actuators implement scanning in the three directions of X, Y, and Z as the overall scanning. Each actuator is constituted by a piezoelectric element (piezo element), and has a cubic shape. The X actuator 3 and Y actuator 5 are supported (held) by a scanner base 9. The X actuator 3 and Y actuator 5 support (hold) the Z actuator holder 11, and the Z actuator holder 11 holds the Z actuator 7.

The scanner base 9 is made of stainless steel. The scanner base 9 has an approximately L-shaped form. More specifically, the scanner base 9 has a first base part 21 extending in the Y-axis direction and a second base part 23 extending in the X-axis direction. One end of the first base part 21 and one end of the second base part 23 are coupled.

The first base part 21 supports one end of the X actuator 3, and the second base part 23 supports one end of the Y actuator 5. The other end of the X actuator 3 and the other end of the Y actuator 5 support the Z actuator holder 11. The Z actuator holder 11 is formed in the shape of a rectangular parallelepiped. The X actuator 3 supports a side surface 25 of the Z actuator holder 11, and the Y actuator 5 supports a side surface 27 that is perpendicular to the side surface 25. The X actuator 3 and Y actuator 5 are adhered to the scanner base 9 and the Z actuator holder 11 with an epoxy adhesive.

As shown in FIG. 4A and FIG. 4B, the Z actuator holder 11 has a holding hole 29 that penetrates through the center thereof in the Z-axis direction. The Z actuator 7 is held inside the holding hole 29. The Z actuator holder 11 supports four edges L in the vertical direction of the Z actuator 7 at the inner surface of the holding hole 29. The surface of the holding hole 29 does not contact the side surface of the Z actuator 7.

The Z actuator 7 and Z actuator holder 11 are examples of the actuator and actuator holder of the present invention. The four edges L of the Z actuator 7 are examples of the plurality of holding line parts of the present invention. A feature of the present invention is that the Z actuator 7 is held at the plurality of holding line parts. The Z actuator 7 and actuator holder 11 contact at lines (or linear portions), and the contact lines correspond to holding line parts. The contact width is extremely small, and may be substantially zero or close to zero. The contact area is also extremely small, and may almost not exist. A holding line part may also be referred to as a "linear holding part" or "linear contact part". A holding line part may be realized by contact between an edge and a surface. According to the example of the present embodiment, an edge of the Z actuator 7 and a surface of the actuator holder 11 contact. Conversely, a surface of the Z actuator 7 and an edge of the actuator holder 11 may contact. More specifically, an outer surface (side surface) of the Z actuator 7 may contact with an edge of the actuator holder 11, and the edge may be provided in the holding hole 29.

The plurality of holding line parts are linear portions that respectively extend in a scanning direction (according to this example, the Z-axis direction) and are separated from each other. More specifically, the plurality of holding line parts are arranged at regular intervals around the circumference of the actuator, and are parallel to the scanning direction. The position of a holding line part may be referred to as a "holding position". A plurality of holding positions are arranged around the circumference of the actuator in a condition in which they are separated from each other, and preferably are arranged at regular intervals. The actuator is held at holding line parts in the scanning direction at the plurality of holding positions. Thus, the actuator holding structure of the present invention can be a linear holding structure. Further, since the plurality of holding line parts are symmetrically arranged, the holding structure of the present invention can be referred to as a "symmetrical linear holding structure".

As shown in the drawings, the Z actuator 7 is supported from the side direction (direction intersecting with the scanning direction (more specifically, the perpendicular direction)) at the aforementioned plurality of holding line parts. In other words, the Z actuator holder 11 supports the Z actuator 7 at an orientation intersecting with the scanning direction ((more specifically, a perpendicular orientation) at a plurality of holding line parts that extend in the scanning direction, from a plurality of directions around the circumference of the actuator.

Further, according to the present embodiment, the Z actuator 7 has a rectangular cross-sectional shape as described above, and contacts the inside of a circular holding hole. More specifically, the actuator has a polygonal cross-sectional shape that contacts the inside of the holding hole of the actuator holder. As a result, the edges L (corner parts of cross-section) contact the inner face of the holder, and holding is favorably realized by the holding line parts.

The Z actuator 7 is pressed into the holding hole 29. Accordingly, the four edges L (holding line parts) of the Z actuator 7 are pressed against by the Z actuator holder 11 without being adhered thereto. As described later, this configuration has the advantage of decreasing a constraint with respect to changes in the shape of the Z actuator 7 in the scanning direction.

Further, since the Z actuator holder 11 contacts the Z actuator 7 only at the four edges L, there are four gaps 31 between the inner face of the holding hole 29 and the Z actuator 7. An elastomer 33 is filled into these gaps 31. Although not shown in the figures, an elastomeric material is provided not only in the gaps 31 but also over a wider area. The elastomeric material may cover the entire scanner device 1 including the scanner base 9, the Z actuator holder 11, the X actuator 3, the Y actuator 5, and the Z actuator 7.

In the above described configuration, the Z actuator holder 11 is, for example, made from PEEK (registered trademark) (polyetheretherketone). PEEK is an insulating material that has a high chemical resistance and a high level of workability. In comparison to Teflon (registered trademark), PEEK has the advantage of providing a high level of workability.

PEEK also has the following advantages compared to a steel material such as stainless steel. The Z actuator 7 is pressed into the holding hole 29 in a state in which four corner parts thereof contact the inner surface of the holding hole 29. If a steel material is used, the rigidity of the actuator holder will increase. Consequently, the corner parts of the actuator will be liable to become damaged when pressing the actuator into the holding hole, and strict dimensional control will be required to avoid damaging the corner parts. In contrast, if PEEK is used, damage is unlikely to occur when pressing the actuator into the holding hole. Further, even if damage occurs, PEEK can maintain the insulation state. Thus, PEEK is advantageous as the material of the Z actuator holder of the present invention.

An elastomer 33 is, for example, polyurethane. This kind of material has a loss factor. A material with a large loss factor can absorb oscillations, and has a high capacity to absorb impacts. From this viewpoint, polyurethane, which has a large loss factor, is used.

Next, an example of a scanning probe microscope (SPM) that includes the scanner device 1 of the present embodiment is described with reference to FIG. 5. According to this example, the SPM is an atomic force microscope (AFM), and more particularly an FM (Frequency Modulation)-AFM. An FM-AFM induces self-oscillation of a cantilever at a resonance frequency, and performs feedback control (Z-scanning) in the Z direction so as to maintain a shift amount of a resonance frequency caused by interaction between the cantilever and a sample at a constant value. An FM-AFM provides a high resolution and can also be used in a non-contact mode.

Figure 5:
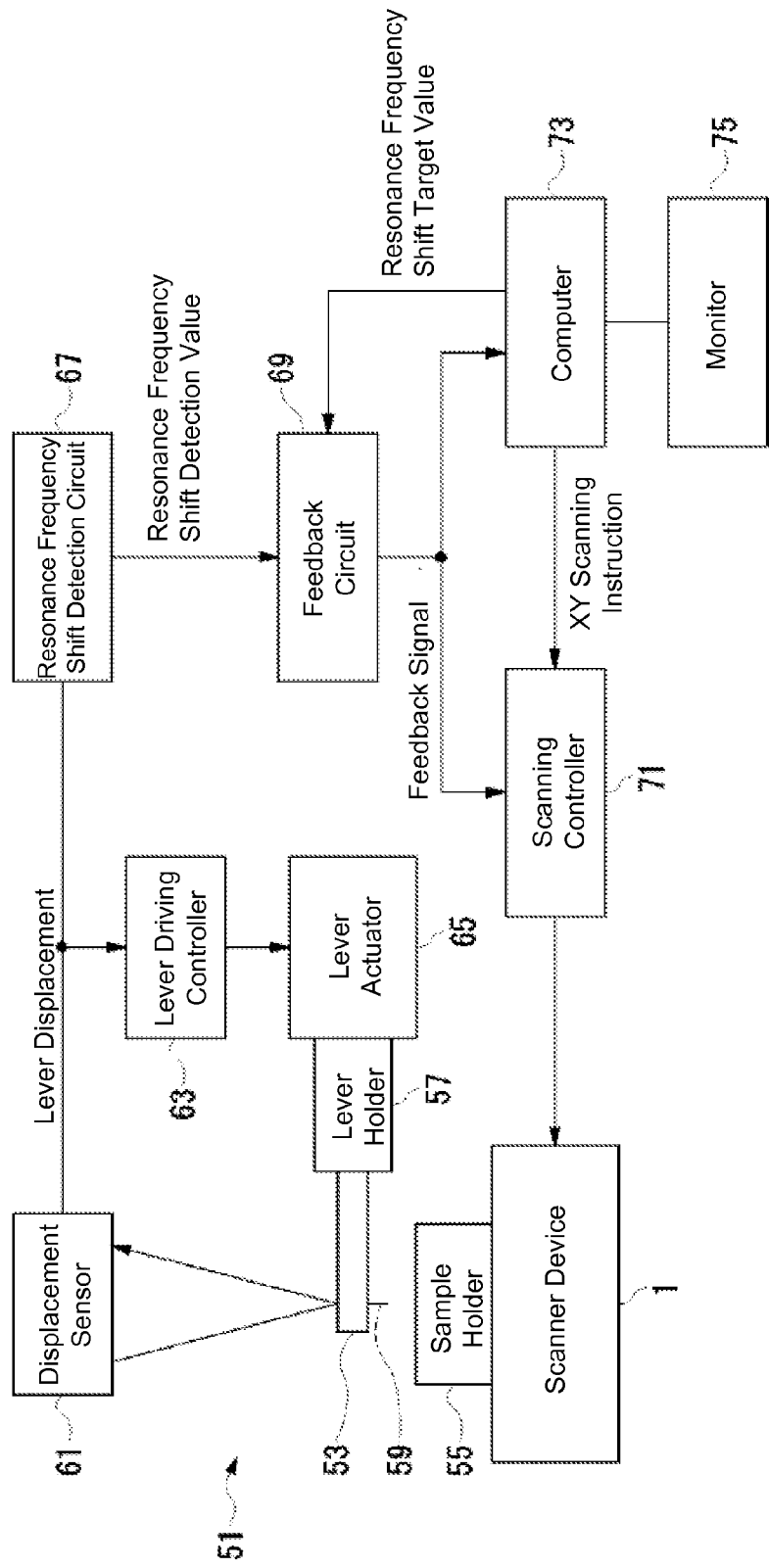
FIG. 5 is a view that shows an example of a scanning probe microscope included in the scanner device.

In FIG. 5, an AFM 51 includes a cantilever 53 and a sample holder 55. The sample holder 55 is attached to the scanner device 1 of the present embodiment. The cantilever 53 is held by a lever holder 57. The cantilever 53 has a probe 59, and is arranged so as to come close to a sample on the sample holder 55.

The AFM 51 includes a displacement sensor 61 that detects a displacement of the cantilever 53 is the Z direction. A lever driving controller 63 controls a lever actuator 65 (piezoelectric element) based on a lever displacement to induce self-oscillation of the cantilever 53. When the probe 59 approaches the sample in a state in which the cantilever 53 self-oscillates, the resonance frequency of the cantilever 53 shifts in accordance with the interaction between the probe 59 and the sample. A resonance frequency shift detection circuit 67 detects a resonance frequency shift of the cantilever 53 based on a displacement of the lever. A feedback circuit 69 generates a feedback signal in accordance with a difference between a detected value and a target value of the resonance frequency shift. A scanning controller 71 controls driving of the scanner device 1 in the Z-axis direction in accordance with the feedback signal. Further, the scanning controller 71 causes the scanner device 1 to perform scanning in the X and Y directions in accordance with X and Y scanning control data that is supplied from a computer 73.

In this manner, the scanner device 1 performs Z scanning that maintains a constant distance between the probe 59 and the sample while performing X and Y scanning. A feedback signal of the Z scanning corresponds to a height in the Z direction of the sample. The computer 73 generates an image of the sample surface based on control data of the X and Y scanning and a feedback signal of the Z scanning, and displays the image on the monitor 75. A three-dimensional image is favorably generated and displayed.

An example of an SPM provided with the scanner device 1 of the present embodiment has been described above. Next, the operation of the scanner device 1 will be described.

In the scanner device 1, the X actuator 3 expands and contracts in the X-axis direction in accordance with a driving voltage for X-axis scanning, the Y actuator 5 expands and contracts in the Y-axis direction in accordance with a driving voltage for Y-axis scanning, and the Z actuator 7 expands and contracts in the Z-axis direction in accordance with a driving voltage for Z-axis scanning. By means of these operations, the scanner device 1 causes scanning of an object to be scanned to be performed in the X-axis direction, the Y-axis direction, and the Z-axis direction. According to the above example, the object to be scanned is the sample holder and a sample held therein.

In this case, attention is focused on the scanning in the Z-axis direction. The Z actuator 7 is held from the side at the four edges L, that is, at the plurality of holding line parts, by the Z actuator holder 11. The plurality of holding line parts extend in the scanning direction and are separated from each other. The Z actuator holder 11 does not support the bottom of the Z actuator 7, unlike the conventional device. This type of holding structure can suppress mechanical coupling between the Z actuator 7 and other mechanical resonance components to a low level. Accordingly, the Z actuator 7 can be provided with a high level of independence, and the Z actuator 7, that is, the Z-axis scanner, can be oscillated in the Z direction in a state close to free oscillation.

According to the present embodiment, the Z actuator 7 is not adhered to the Z actuator holder 11, but is held by press fitting. Therefore, the expansion and contraction in the Z direction of the Z actuator 7 is mainly constrained only by frictional force. The press-fitting structure does not generate the kind of large strain that is generated in a case in which the Z actuator 7 is adhered. This fact weakens constraints relating to the Z actuator 7 and further increases the independence of the motion of the Z actuator 7.

Further, according to the present embodiment, the positions of the X actuator 3 and the Y actuator 5 also contribute to the independence of the actuator. According to the present embodiment, the X actuator 3 and Y actuator 5 support the Z actuator holder 11 at sides of the Z actuator 7. More specifically, the X actuator 3 and Y actuator 5 are positioned at the same position as the Z actuator 7 along the scanning direction, and are positioned in a direction that intersects with the scanning direction, more specifically, a direction perpendicular to the scanning direction, with respect to the Z actuator 7. In comparison to a configuration in which the X and Y actuators are arranged on the upper side or lower side of the Z actuator, with this configuration it is difficult for the impact of oscillations in the Z direction to be transmitted to the X and Y actuators. Accordingly, the level of independence of the Z actuator increases.

As described above, according to the present embodiment, the Z actuator has a high level of independence. Therefore, the Z actuator, that is, the Z-axis scanner, can change position evenly to both sides (in both the upper and lower directions) along the scanning direction in a state close to free oscillation. The impact of oscillations of the actuator can be significantly mitigated, and the resonance frequency can be made a value that is close to the resonance frequency of free oscillation. When it is considered that the resonance frequency of the conventional structure is half the resonance frequency of free oscillation, a resonance frequency that is approximately double the resonance frequency of the conventional structure can be obtained according to the present invention. Consequently, scanning can be performed at a frequency and speed that are significantly higher than those in the conventional devices.

According to the present embodiment, the elastomer 33 is provided in gaps between the actuator holder 11 and the Z actuator 7. According to this example, the elastomeric material is a material with a large loss factor, for example, polyurethane. By providing the elastomer 33, the impact of oscillations of the Z actuator 7 can be further reduced. According to the above described linear holding structure, even if oscillations of the Z actuator 7 remain, the remaining oscillations are absorbed by the elastomeric material and thereby favorably reduced. Accordingly, the scanning frequency and scanning speed can be favorably increased.

According to the structure of the present embodiment, when the X actuator 3 and Y actuator 5 expand or contract, a strain also occurs at portions other than the Z actuator 7. However, although the size of the piezoelectric element of each actuator is in the order of millimeters, a displacement of the piezoelectric element is in the order of nanometers. Accordingly, a displacement error caused by strain of these actuators can be ignored. Therefore, a displacement of each piezoelectric element may be used as it is as a displacement amount in the XY direction of the Z actuator.

Next, an implementation example of the present invention will be described referring to FIG. 6A and FIG. 6B. This example uses the scanner device 1 described in the above embodiment. The dimensions of each part are as follows: the total length in the X direction (length in X direction of scanner base 9) is 7 mm, the total length in the Y direction (length in Y direction of scanner base 9) is also 7 mm, and the total height in the Z direction (height of scanner base 9) is 3 mm. Each actuator (piezoelectric element) is a cube with dimensions of 2 mm×2 mm×2 mm. Each actuator changes position at a sensitivity of 22 nm/V with respect to the driving voltage. However, in relation to the Z direction, since the piezoelectric element changes position evenly in the upward and downward directions, the sensitivity is approximately ½, that is, 11 nm/V. The resonance frequency at the time of free oscillation of this piezoelectric element is approximately 500-550 kHz.

Figure 6A:
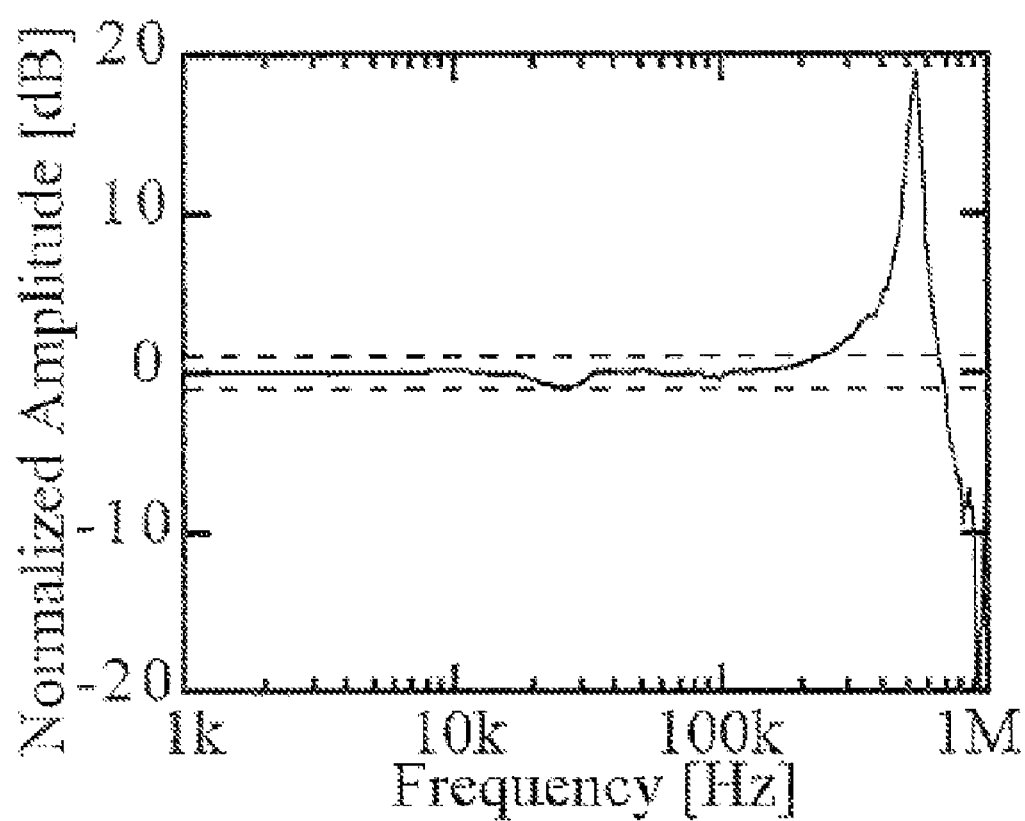
FIG. 6A is a view that illustrates the driving frequency dependence of a displacement amount in the scanner device.
Figure 6B:
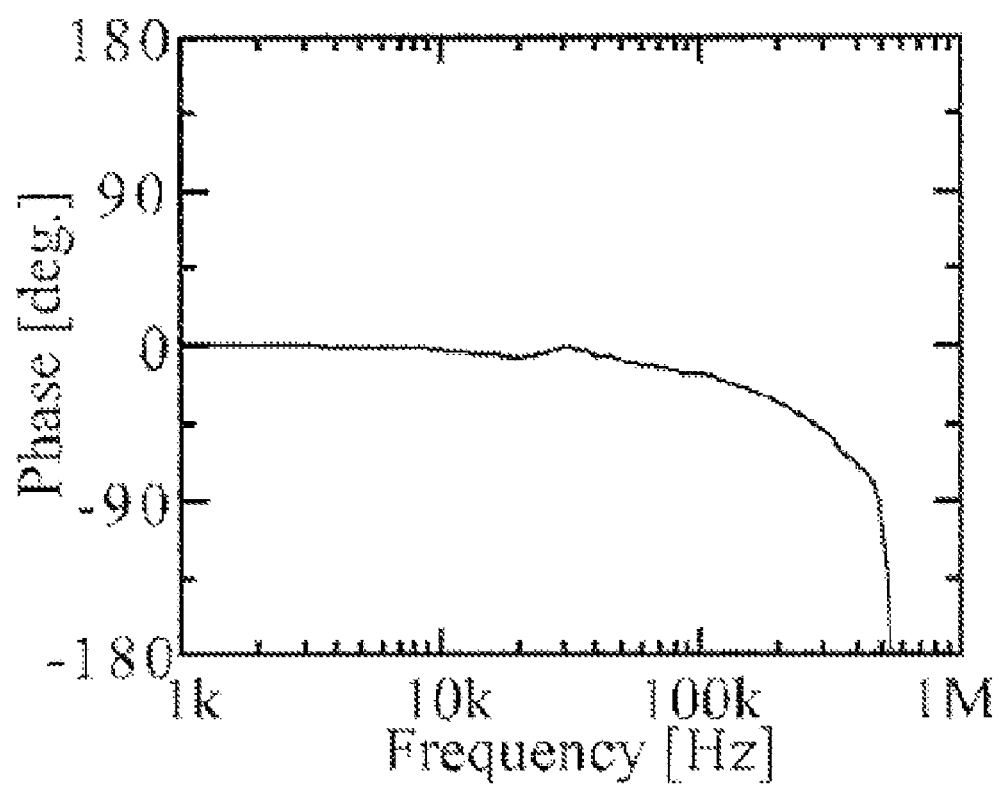
FIG. 6B is a view that illustrates the driving frequency dependence of the phase in the scanner device.

FIG. 6A and FIG. 6B show the displacement amount of the Z actuator and the driving frequency dependence of the phase. In FIG. 6A, the abscissa axis represents the driving frequency and the ordinate axis represents the displacement amount. In FIG. 6B, the abscissa axis represents the frequency and the ordinate axis represents the phase.

In FIG. 6A, the peak position of the frequency is approximately 540 kHz. More specifically, the resonance frequency of the Z actuator is approximately 540 kHz, which approximately matches the resonance frequency at a time of free oscillation. It is thus found that according to the configuration of the present invention it is possible to avoid decreasing the resonance frequency of the Z actuator.

Furthermore, as shown in FIG. 6A, a small peak can be seen in the region of approximately several tens of kHz. This is considered to be due to the excitation of other resonance that exists in the overall scanner, and a response to such other resonance appearing in the Z-axis direction. However, the displacement amount is 1 dB or less, which is extremely small. Further, almost no influence can be seen on the phase characteristics shown in FIG. 6B. Accordingly, this peak is suppressed to a level that can be practically ignored. It is thus found that the scanner configuration of the present invention suppresses mechanical coupling between a scanner for Z-axis driving and other mechanical resonance to a low level, and has a high degree of independence.

The above example will now be compared with the conventional configuration. Conventionally, the resonance frequency of a Z-axis scanner has been half the resonance frequency at free oscillation. Accordingly, the resonance frequency peak has been approximately half the peak frequency shown in FIG. 6A. Further, according to the conventional configuration, the impact of oscillations of the Z-axis scanner is transmitted to the X- and Y-axis scanners, and the impact of oscillations of the X- and Y-axis scanners is transmitted to the Z-axis scanner. Consequently, an oscillation with a relatively large amplitude arises in the Z-axis scanner in a region of approximately 10 to 50 kHz. Since the scanning frequency of a conventional common scanner is, at most, approximately 1 kHz, that above described resonance frequency or other oscillations do not constitute a problem.

However, the present invention is directed towards increasing the speed of an SPM, and in that case the above described resonance or oscillations constitute a problem. As shown in FIG. 6A and FIG. 6B, the present invention can significantly increase the resonance frequency and can also reduce oscillations in a region of several tens of kHz to a level that can be ignored, thus enabling an increase in the speed of a SPM.

Further, as shown in FIG. 6A and FIG. 6B, the scanner of the present invention does not have an unnatural peak in the amplitude characteristics and frequency characteristics. This characteristic is advantageous in the following respect also. A method has been proposed that suppresses a resonant oscillation peak of a scanner by preparing a model circuit that has the same amplitude and phase characteristics as the scanner, and then predicting the oscillation of the scanner based on the response of the model circuit. Because the scanner of the present invention does not have an unnatural peak or irregular characteristics, an accurate model circuit can be comparatively easily made for the scanner of the present invention. Accordingly, the resonant oscillation peak can be easily suppressed using the above method.

Figure 7:
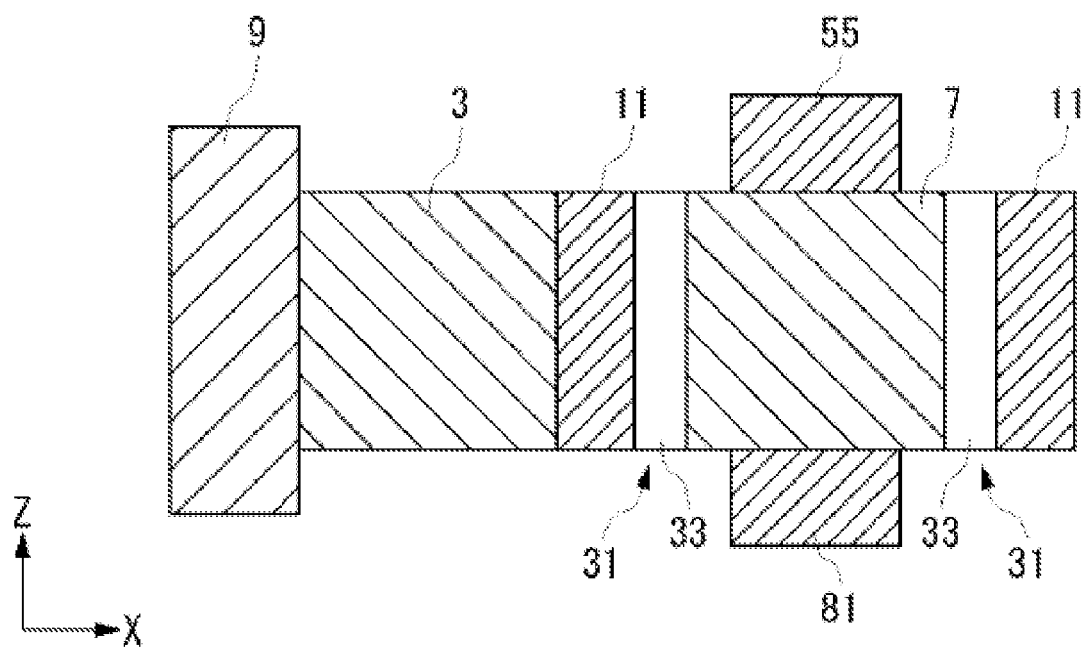
FIG. 7 is a view that illustrates an application example of the present embodiment.

Next, a favorable application example of the present embodiment is described referring to FIG. 7. According to the example shown in FIG. 5, a sample holder is arranged at one end of the scanner device 1. In the example shown in FIG. 7, a counter weight is further arranged on the scanner device 1.

In FIG. 7, the sample holder 55 is arranged at one end of the Z actuator 7. A counter weight 81 is arranged at the other end of the Z actuator 7. The weight of the counter weight 81 is set to the same weight as that of the sample holder 55 that is the object to be scanned. According to this configuration, the weights at both ends of the actuator can be made equal, so that oscillation of the actuator is reduced further and the scanning frequency and scanning speed can be favorably increased.

Next, a modification example of the present embodiment is described. According to the above described embodiment, the cross-section of the Z actuator 7 is a square, and the Z actuator 7 is supported by the Z actuator holder 11 at four line parts. However, the present invention is not limited to the above embodiment. The Z actuator may be held at a different number of holding line parts. For example, the actuator may be held at three holding line parts or may be held at five or more holding line parts. For example, the Z actuator may have a triangular cross section, or may have a sectional shape that has five or more vertices.

According to the present embodiment, the holding hole 31 of the Z actuator holder 11 is circular. However, within the scope of the present invention, the holding hole 31 may be a shape other than circular.

According to the present embodiment, the surface of the actuator holder contacts with line parts at the corners (edges) of the actuator. Conversely, the actuator holder may have a plurality of corners (edges) in the holding hole, and line parts of the corners may contact with the surface of the actuator. For example, the actuator holder may include a plurality of linear protrusions that extend in the scanning direction on the inner face of the holding hole. The plurality of protrusions may contact the outer circumferential surface of the actuator to thereby support the actuator.

According to the present embodiment, the present invention is applied to a Z actuator. However, the present invention may also be applied to another actuator, for example, an X actuator and/or a Y actuator. The present invention may also be applied to all there actuators.

According to the present embodiment, the scanner device includes three actuators. However, the scanner device may include only an actuator for one direction. For example, the Z scanner may be separated from the X and Y scanners, and the present invention may be applied to the Z scanner. For example, the probe may be scanned by the Z scanner, and the sample may be scanned by the X and Y scanners. In many cases, a scanning tunneling microscope (STM) is configured so as to scan a probe.

As will be clear from the foregoing description, the present invention is not limited to an AFM, and may be applied to an arbitrary SPM.

A preferred embodiment of the present invention has been described above. According to the present invention, an actuator holder holds an actuator at a plurality of holding line parts that extend in a scanning direction. By means of this configuration, mechanical coupling between the actuator and other parts is suppressed to a low level, the actuator has a high degree of independence, and the actuator can change position evenly to both sides in the scanning direction in a state close to free oscillation. Further, the impact of actuator oscillations can be significantly mitigated, and the resonance frequency can be made a value close to the resonance frequency of free oscillation. As a result, scanning can be performed at a higher frequency and speed than in a conventional device.

While the currently conceivable, preferred embodiment of the invention has been described above, it will be understood that various variations and modifications can be made to the embodiment, and it is intended that all such variations and modifications within the spirit of truth and the scope of the invention are included by the attached claims.

INDUSTRIAL APPLICABILITY

The scanner device of the present invention can be advantageously used in technology that increases the speed of a scanning probe microscope.

The invention claimed is:

1. A scanner device used in a scanning probe microscope, comprising:
    an actuator which scans an object to be scanned in a scanning direction; and
    an actuator holder which holds the actuator;
    wherein the actuator holder holds the actuator at a plurality of holding line parts which extend in the scanning direction and are separated from each other.

2. The scanner device according to claim 1, wherein the plurality of holding line parts are arranged at regular intervals around the circumference of the actuator and are parallel to the scanning direction.

3. The scanner device according to claim 1, wherein the actuator holder holds the actuator by pressing the actuator at the plurality of holding line parts.

4. The scanner device according to claim 1, wherein the actuator has a shape which includes a plurality of edges which extend in the scanning direction, and the plurality of edges contact a face of the actuator holder.

5. The scanner device according to claim 1, wherein the actuator holder has a holding hole in the scanning direction, and wherein the actuator has a polygonal cross-sectional shape which contacts an inner side of the holding hole, and is held in the holding hole.

6. The scanner device according to claim 5, wherein the actuator is pressed into the holding hole of the actuator holder so as to contact the actuator holder at the plurality of holding line parts.

7. The scanner device according to claim 5, wherein the actuator holder is made with an insulating material.

8. The scanner device according to claim 5, wherein an elastomer is provided in a gap between an inner face of the holding hole of the actuator holder and an outer face of the actuator.

9. The scanner device according to claim 1, further comprising another actuator which performs scanning in a direction which is different to the scanning direction, wherein the another actuator supports the actuator holder at a side of the actuator.

10. The scanner device according to claim 1, wherein the actuator supports the object to be scanned at one end in the scanning direction and supports a counter weight at another end in the scanning direction.

11. A scanning probe microscope which comprises a scanner device according to claim 1.

12. A method of scanning an object to be scanned for a scanning probe microscope, comprising:
   providing an actuator for scanning the object to be scanned in a scanning direction; and
   scanning in a state in which the actuator is held at a plurality of holding line parts which extend in the scanning direction and are separated from each other.

13. A method of manufacturing a scanner device used in a scanning probe microscope, comprising:
   preparing an actuator which scans an object to be scanned in a scanning direction; and
   making the actuator be held at a plurality of holding line parts which extend in the scanning direction and are separated from each other.

* * * * *